United States Patent [19]
McCauley et al.

[11] Patent Number: 5,112,176
[45] Date of Patent: May 12, 1992

[54] SHROUDED ANTI-THEFT LOCKNUT

[75] Inventors: Peter L. McCauley, Williamsville; Jeffrey R. Sullivan, Boston, both of N.Y.

[73] Assignee: McGard, Inc., Orchard Park, N.Y.

[21] Appl. No.: 697,998

[22] Filed: May 9, 1991

[51] Int. Cl.5 .............................................. F16B 37/08
[52] U.S. Cl. ..................................... 411/432; 411/533; 411/910
[58] Field of Search ............... 411/403, 405, 427, 432, 411/533, 910

[56] References Cited

U.S. PATENT DOCUMENTS

| | | | |
|---|---|---|---|
| 1,447,564 | 3/1923 | Norlund et al. | 411/910 |
| 3,519,979 | 7/1970 | Bodenstein | 411/910 |
| 4,618,299 | 10/1986 | Bainbridge et al. | 411/910 |
| 4,897,008 | 1/1990 | Parks | 411/432 |

OTHER PUBLICATIONS

Four photographs showing four views of two prior locknuts.

*Primary Examiner*—Neill R. Wilson
*Attorney, Agent, or Firm*—Joseph P. Gastel

[57] ABSTRACT

A locknut including a nut member having an internal thread extending throughout its length, a key-receiving configuration on the outer end of the nut member in radial overlapping relationship with a portion of the internal thread, a shroud rotatably mounted on the nut member and having an annular end which is in radial overlapping relationship with the key-receiving configuration, an internal flange on the shroud, an external groove in the nut member for receiving the internal flange to permit relative rotation between the nut member and the shroud while preventing separation therebetween, a cam surface on the nut member over which the internal flange travels to be positioned within the external groove on the nut member, an external flange on the nut member, and an internal shoulder on the shroud for engagement by the external flange to permit the nut member to rotate relative to the shroud while the external flange is in engagement with the internal shoulder.

10 Claims, 2 Drawing Sheets

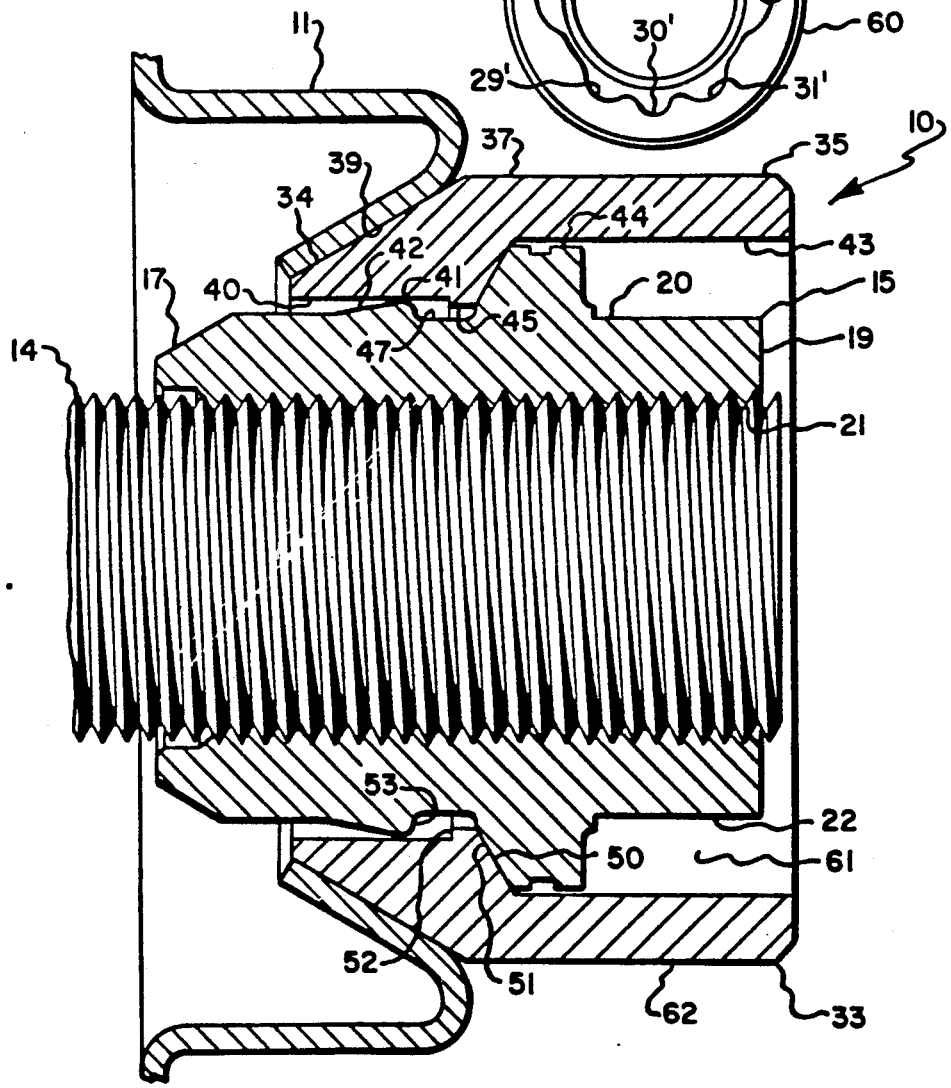

SHROUDED ANTI-THEFT LOCKNUT

BACKGROUND OF THE INVENTION

The present invention relates to a locknut of the type which is used to secure an automotive wheel rim to an associated stud.

By way of background, there are prior types of locknuts in existence having a rotatable washer-like member thereon which bears against an automotive wheel rim when the nut is threaded onto an associated stud. One of these prior locknuts includes a nut member which has an elongated threaded blind bore therein which receives a stud and the nut member rotatably mounts a shroud which is separate from the washer-like member and which encircles the blind end of the nut member. In this prior locknut the outer surface of the blind end of the nut receives a key. In another prior locknut, the washer-like member is mounted only on the inner or front end of the nut, and the rear end is of a configuration to receive a key. However, in both of the foregoing prior locknuts a portion of the nut member extends beyond the threads. The deficiency of the foregoing structures is that since the threaded bore has to be sufficiently long to provide proper threaded engagement with its associated stud, the additional length required for receiving a key causes the locknut to have an undesirably long axial dimension and also possibly have excess weight in the sense that the additional length causes it to be heavier than the conventional nuts which are also mounted on the rim, to thereby create an unbalance. Furthermore, in the prior structures there were external openings between various of the mating parts which could accumulate road debris.

SUMMARY OF THE INVENTION

It is accordingly one object of the present invention to provide a locknut consisting of a nut member with a rotatable shroud thereon, the locknut being of the same weight as conventional nuts with which it is used on a wheel rim and which has a relatively long internal thread for engagement with an associated stud and which is of a relatively short overall axial dimension and in which the rotatable shroud serves the dual purpose of having one end bearing against the rim and the other end surrounding a key-receiving portion of the nut to prevent unauthorized acess thereto.

Another object of the present invention is to provide an improved locknut consisting of a combination of a nut member and a shroud rotatable thereon wherein all interengaging parts between the nut member and the shroud are located internally of the shroud to thereby protect such parts against entry of foreign matter to which a vehicle wheel rim is subjected.

A further object of the present invention is to provide an improved locknut consisting of a combination of a nut member and a shroud rotatable thereon wherein the parts are assembled in an unique manner. Other objects and attendant advantages of the present invention will readily be perceived hereafter.

The present invention relates to a locknut for mounting on a threaded stud and bearing against a member to be secured to said stud comprising a nut member having an inner nut end and an outer nut end and a central nut portion therebetween, internal thread means in said nut member extending substantially throughout the entire axial length thereof for threadably mounting said nut on said threaded stud, an annular shroud having an inner shroud end for bearing against said member and an outer shroud end and a central shroud portion therebetween, mounting means for rotatably mounting said annular shroud on said nut member, a key-receiving configuration on said outer nut end, and said outer shroud end surrounding said key-receiving configuration on said outer nut end and lying in radial overlapping relationship.

The various aspects of the present invention will be more fully understood when the following portions of the specification are read in conjunction with the accompanying drawings wherein:

BRIEF DESCRIPTION OF THE DRAWINGS

FIG. 1 is a side elevational view of an automotive wheel including a tire mounted on a rim which is secured to the axle with a plurality of nuts including a locknut of the present invention;

FIG. 2 is an enlarged fragmentary cross sectional view taken substantially along line 2—2 of FIG. 1;

FIG. 6 is a reduced view taken substantially in the direction of arrows 6—6 of FIG. 4 and showing the pattern on the locknut; and FIG. 7 is a view taken in the direction of arrows 7—7 of FIG. 5 and showing the pattern on the key for mating with the pattern on the nut portion of the locknut.

DESCRIPTION OF THE PREFERRED EMBODIMENTS

Figure 3:
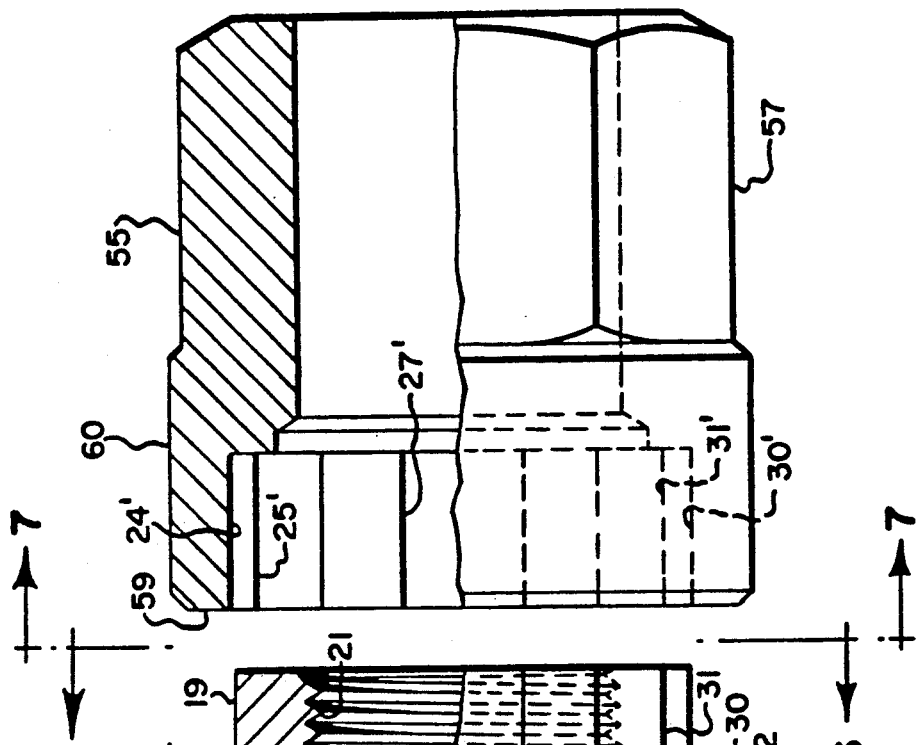
FIG. 3 is a fragmentary side elevational view, partially in cross section, of the shroud portion of the locknut.

In FIG. 1 the improved locknut 10 of the present invention is shown in conjunction with a automotive wheel rim 11 on which a tire 12 is mounted. The rim 11 is attached to the axle by means of a plurality of conventional lug nuts 13 and the locknut 10 of the present invention, all of which are threaded onto associated studs 14. The locknut 10 can only be turned by a proper mating key, and thus it prevents unauthorized removal of rim 11.

The locknut 10 includes a nut member 15 having an inner end 17, an outer end 19 and a central portion 20 therebetween. The nut member 15 is internally threaded at 21 substantially throughout its length for threadably mounting on an associated stud 14. Therefore, the nut member need not be any longer axially than the number of threads required for properly engaging the stud, and thus it can have a minimum length. The outer end 19 of nut member 15 has a key-receiving portion 22 which is an undulating external pattern consisting of a plurality of lobes, such as 23, 24, 25, 27, 29, 30, 31 and 32 thereon which are spaced from each other by adjacent grooves (not numbered).

A shroud 33 includes an inner end 34, an outer end 35 and a central portion 37 therebetween. The inner end 34 of the shroud is inclined as shown at the same angle as the shroud-receiving opening 39 of rim 11. The outer end 35 of the shroud is radially spaced from the outer end 19 of the nut member 15 and is oriented in radial overlapping relationship therewith.

The shroud 33 is rotatably mounted on nut member 15 by virtue of the fact that the bore 40 on the inner end 34 of the shroud is slightly larger than the maximum diameter 41 of annular cam surface 42, and the bore 43 of the shroud is slightly larger than the diameter of annular flange 44. Shroud 33 is loosely retained on nut member 15 by virtue of the fact that internal flange 45 of the shroud is of larger diameter than the annular external groove 47 in the nut member 15. It is to be noted that external groove 47 of the nut member and internal flange 45 of the shroud are within the shroud and are thus concealed against the entry of road debris.

The shroud 33 can move axially on nut member 15 within the width 49 of groove 47 (FIG. 4), and this movement is limited in one direction when internal inclined surface 50 of shroud 33 engages external inclined surface 51 of flange 44, and its movement in the opposite direction is limited by the engagement of the shoulder 52 of internal flange 45 with the shoulder 53 on annular cam surface 42 at the side of groove 47.

Figure 4:
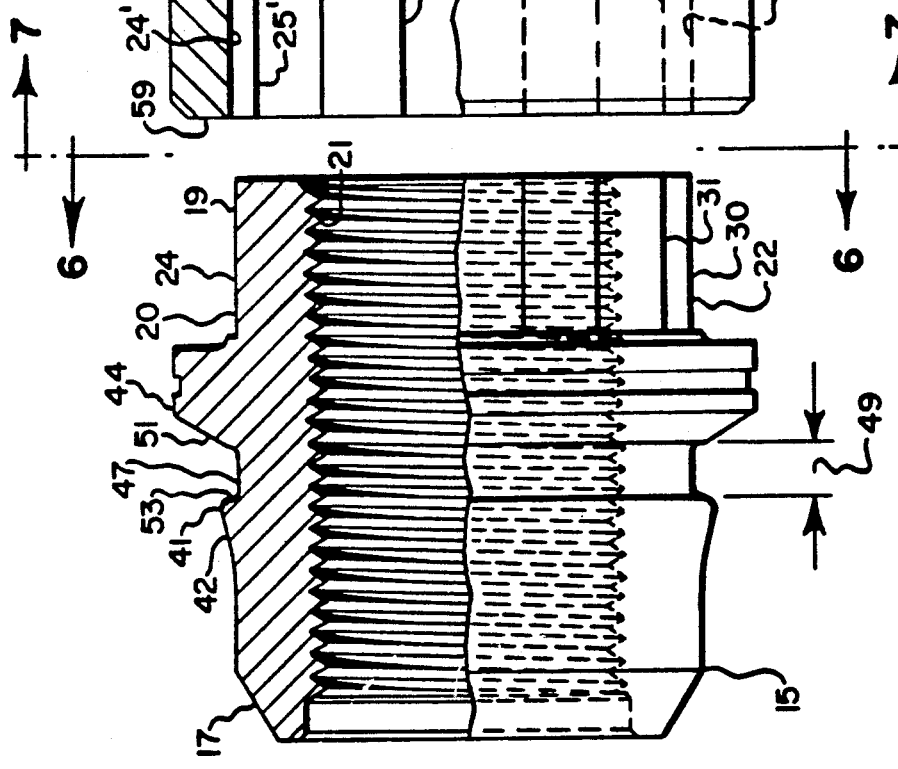
FIG. 4 is a fragmentary side elevational view, partially in cross section, of the nut portion of the locknut.
Figure 5:
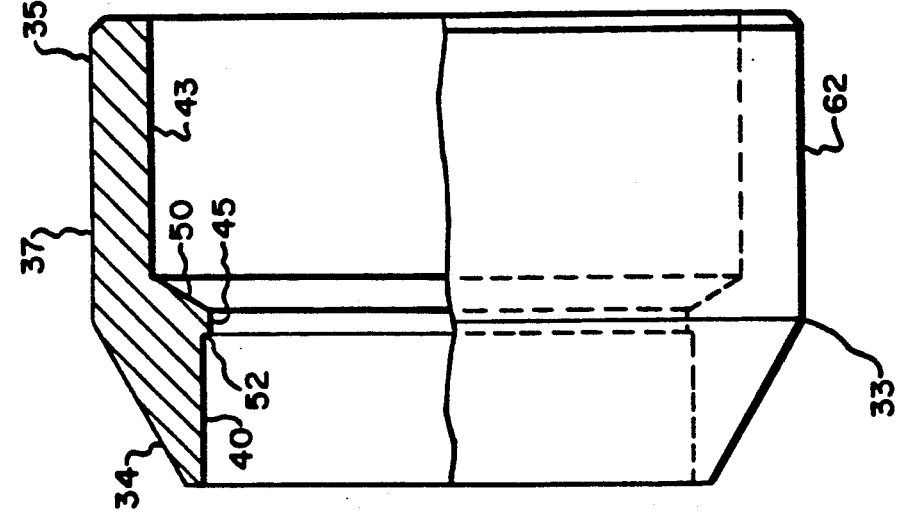
FIG. 5 is a fragmentary side elevational view, partially in cross section, of the key for turning the nut portion of the locknut.

The nut member 15 is assembled with shroud 33 by inserting the inner end 17 of the nut member into bore 43 and through bore 40 until internal flange 45 reaches annular cam surface 42. The maximum diameter 41 of cam surface 42 is larger than the internal diameter of annular flange 45 by a few thousandths of an inch. The nut member 15 is then pressed relative to shroud 33 so that internal flange 45 rides up over cam surface 42 and is thereafter positioned in annular groove 47. This requires a slight expansion of internal flange 45, but when it falls into groove 47, it springs back to its original shape so that the shroud 33 and nut member 15 cannot thereafter be separated, but they can move axially relative to each other within the groove width 49 (FIG. 4).

In order to install locknut 10 onto its associated stud 14, a key 55 is used. Key 55 has a hexagonal head 57 for receiving a wrench to turn it. It also has an end 59 which mates with the outer end 19 of nut member 15. More specifically, key 55 includes an annular portion 60 which contains a plurality of grooves 23', 24', 25', 27', 29', 30', 31' and 32' which mesh in complementary mating relationship with lobes 23, 24, 25, 27, 29, 30, 31 and 32, respectively, of nut member 15. The lobes (not numbered) between the above-designated grooves of the key 55 fit in complementary mating relationship with the grooves between the lobes of the nut member 15. Furthermore, the annular end 59 of the key 55 is of a radial dimension so that it fits into the space 61 between the outer ends of the nut member 15 and the shroud 33.

In use, the locknut 10 is threaded onto stud 14 by the use of a key 55. More specifically, as the nut member 15 is threaded onto stud 14, it will advance axially to the left in FIG. 2. All this while, the shroud 33 remains loosely mounted on nut member 15 and it will advance with it. A point will be reached wherein the surface 34 of the shroud engages the internal surface 39 of the rim. At this time, any previous rotation of the shroud 33 with the nut member 15 will cease. However, at this point the inclined surface 51 of flange 44 will rotate relative to mating inclined surface 50 of the shroud to continue to advance the shroud axially without rotation, and thus there will be a pressing engagement between parts 34 and 39 of the shroud and rim, respectively, without relative rotation therebetween. It is to be noted that surfaces 50 and 51 are concealed within shroud 33 and therefore no parts thereof will be exposed to road debris. The outer surface 62 of the shroud is extremely hard so that even if a wrench is applied thereto, it will not grip it, but will merely slide thereon.

The parts of the locknut 10 bear an unique relationship to each other. First of all, the overall axial length of locknut 10 is relatively short. As noted above, this is achieved by the fact that the entire length of the nut member 15 is internally threaded, and thus there is no additional length required for a key-receiving portion. In this respect, the key-receiving portion 22 is located on the outside of the outer end of nut member 15 and radially outwardly of the threads on the outer end of nut member 15. Thus, the radial overlapping relationship of the threads and the key-receiving portion 22 is a primary factor in causing the overall axial length of the nut member to be relatively short while still having sufficient threads to provide good engagement with an associated stud. Also, as can be seen from FIG. 2, the stud 14 enters the outer end 19 of the nut and thus reinforces the key-receiving portion 22 against distortion when key 55 applies a torque thereto. Furthermore, the outer end 35 of the shroud lies radially outwardly of the key-receiving portion 22 to prevent a tool other than the proper key from being applied to the key-receiving portion 22 of the nut member. Since the annular end 59 of key 55 fits closely into space 61 between the outer ends of the nut member 15 and shroud 33, the inner surface at the outer end of the shroud reinforces the annular end 59 of the key from distorting outwardly when a torque is applied thereto. In this respect, in one embodiment the clearance between the inner diameter of the bore of the shroud and the outer diameter of the key was 0.010 inches. Furthermore, the outer end 35 of the shroud terminates only slightly beyond the outer end 19 of the nut member so that it permits the overall length of locknut 10 to be relatively short, that is, to have a relatively small axial dimension. Additionally, the shroud serves the dual purpose in a single element of bearing against the rim and also protecting the outer end of the nut member against unauthorized access. Furthermore, because there is no key-receiving portion extending axially beyond the thread of the nut member, the weight of the locknut can be matched to the weight of the conventional nuts also used on the wheel rim, thereby obviating wheel unbalance in this respect.

It can thus be seen that the locknut of the present invention is manifestly capable of achieving the above enumerated objects, and while preferred embodiments of the present invention have been disclosed, it will be appreciated that the present invention is not limited thereto but may be otherwise embodied within the scope of the following claims.

What is claimed is:

1. A locknut for mounting on a threaded stud and bearing against a member to be secured to said stud comprising a nut member having an inner nut end and an outer nut end and a central nut portion therebetween, an internal and external surface on said nut member, internal thread means on said internal surface of said nut member extending substantially throughout the entire axial length thereof for threadably mounting said nut on said threaded stud, an annular shroud having an inner shroud end and an outer shroud end and a central shroud portion therebetween, surface means on said inner shroud end for bearing against said member to be secured to said stud, coacting means between said nut member and said annular shroud for causing said surface means to bear against said member when said nut member is threaded onto said stud, mounting means for permanently rotatably mounting said annular shroud in assembled relationship on said nut member when said locknut is not mounted on said stud, a key-receiving configuration on said external surface at said outer nut end, and said outer shroud end surrounding said key-receiving configuration on said outer nut end and lying in radial overlapping relationship therewith.

2. A locknut as set forth in claim 1 wherein said internal thread extends throughout said axial length of said nut member.

3. A locknut as set forth in claim 1 wherein said outer shroud end terminates substantially even with said outer nut end.

4. A locknut as set forth in claim 1 wherein a portion of said internal thread means are also in radial overlapping relationship with a portion of said outer shroud end.

5. A locknut as set froth in claim 1 wherein an annular space exists between said outer nut end and said outer shroud end, a key, an annular end on said key for placement into said annular space for engaging said key-receiving configuration and fitting sufficiently closely within said outer shroud end to reinforce said annular end of said key against distortion.

6. A locknut as set forth in claim 1 wherein said inner nut end of said outer nut member extends outwardly beyond said inner shroud end of said annular shroud.

7. A locknut for mounting on a threaded stud and bearing against a member to be secured to said stud comprising a nut member having an inner nut end and an outer nut end and a central nut portion therebetween, internal thread means in said nut member extending substantially throughout the entire axial length thereof for threadably mounting said nut on said threaded stud, an annular shroud having an inner shroud end for bearing against said member and an outer shroud end and a central shroud portion therebetween, mounting means for rotatably mounting said annular shroud on said nut member, an annular flange on said central nut portion, an annular shoulder within said annular shroud, mating relatively rotatable surfaces on said annular flange and said annular shoulder for permitting said shroud to advance axially when said nut member is threaded onto said stud and said inner end of said shroud is in engagement with said member which is to be secured to said stud, a key-receiving configuration on said outer nut end, said outer shroud end surrounding said key-receiving configuration on said outer nut end and lying substantially even therewith, said internal thread extending substantially throughout the axial length of said nut member, said mounting means comprising an internal flange in said shroud, and an external groove on said nut for receiving said internal flange, a loose fit between said internal groove and said internal flange, said annular flange having a first diameter, a first internal bore in said shroud extending from said outer shroud end toward said central shroud portion and having a second diameter which is larger than said first diameter, a second internal bore in said shroud extending from said inner shroud end toward said central shroud portion and having a third diameter, said inner end of said nut having a fourth diameter which is generally smaller than said third diameter whereby said inner nut end may be inserted into said first internal bore of said shroud and can pass into said second internal bore of said shroud, and cam means on said central portion of said nut on the opposite side of said external grove from said annular flange, said cam means having an outer diameter which is slightly larger than the internal diameter of said internal flange so that said internal flange can be cammed outwardly before moving into said external groove.

8. A locknut as set forth in claim 7 including second shoulder means at the side of said cam means in said external groove for preventing said internal flange from moving out of said external groove.

9. A locknut for mounting on a threaded stud and bearing against a member to be secured to said stud comprising a nut member having an inner nut end and an outer nut end and a central nut portion therebetween, internal thread means in said nut member for threadably mounting said nut on said threaded stud, an annular shroud having an inner shroud end and an outer shroud end and a central shroud portion therebetween, surface means on said inner shroud end for bearing against said member to be secured to said stud, mounting means for rotatably mounting said annular shroud on said nut member, an annular flange on said central nut portion, an annular shoulder within said annular shroud, mating relatively rotatable surfaces on said annular flange and said annular shoulder for permitting said shroud to advance axially when said nut member is threaded onto said stud and said inner end of said shroud is in engagement with said member which is to be secured to said stud, a key-receiving configuration on said outer nut end, said outer shroud end surrounding said key-receiving configuration on said outer nut end, said mounting means comprising an internal flange formed integrally with said shroud and an external groove on said nut for receiving said internal flange, a loose axial fit between said external groove and said internal flange, said annular flange having a first diameter, a first internal bore in said shroud extending from said outer shroud end toward said central shroud portion and having a second diameter which is larger than said first diameter, a second internal bore in said shroud extending from said inner shroud end toward said central shroud portion and having a third diameter, said inner end of said nut having a fourth diameter which is generally smaller than said third diameter whereby said inner nut end may be inserted into said first internal bore of said shroud and can pass into said second internal bore of said shroud, cam means on said central portion of said nut on the opposite side of said external groove from said annular flange, said cam means being formed integrally with said nut and having an outer diameter which is slightly larger than the internal diameter of said internal flange so that said internal flange can be cammed outwardly while passing over said cam means before moving into said external groove, and shoulder means between said cam means and said groove for preventing said internal flange from moving out of said groove after said internal flange has passed over said cam means.

10. A locknut for mounting on a threaded stud and bearing against a member to be secured to said stud comprising a nut member having an inner nut end and an outer nut end and a central nut portion therebetween, an internal and external surface on said nut member, internal thread means on said internal surface of said nut member for threadably mounting said nut on said stud, an annular shroud having an inner shroud end and an outer shroud end and a central shroud portion therebetween, surface means on said inner shroud end for bearing against said member to be secured to said stud, coacting means between said nut member and said annular shroud for causing said surface means to bear against said member when said nut member is threaded onto said stud, said coacting means comprising an annular flange on said central nut portion and an internal shoulder on said central shroud portion, mounting means for permanently rotatably mounting said annular shroud in assembled relationship on said nut member when said locknut is not mounted on said stud, said mounting means comprising an internal flange on said shroud having a first diameter, cam means on said nut having a second diameter which is large than said first diameter, a groove in said nut between said cam means and said annular flange, said groove having a third diameter which is smaller than said first diameter, said groove being located between said cam means and said annular flange, shoulder means adjacent said cam means and bordering said groove for preventing said internal flange from moving back over said cam means after it has moved over said cam means in traveling toward said annular flange and entered said groove, a key-receiving configuration on said external surface at said outer nut end, and said outer shroud end surrounding said key-receiving configuration on said outer nut end and lying in radial overlapping relationship therewith.

* * * * *